D. ROSSI.
ARTIFICIAL FLOWER STEM.
APPLICATION FILED AUG. 26, 1916.
1,204,905.
Patented Nov. 14, 1916.
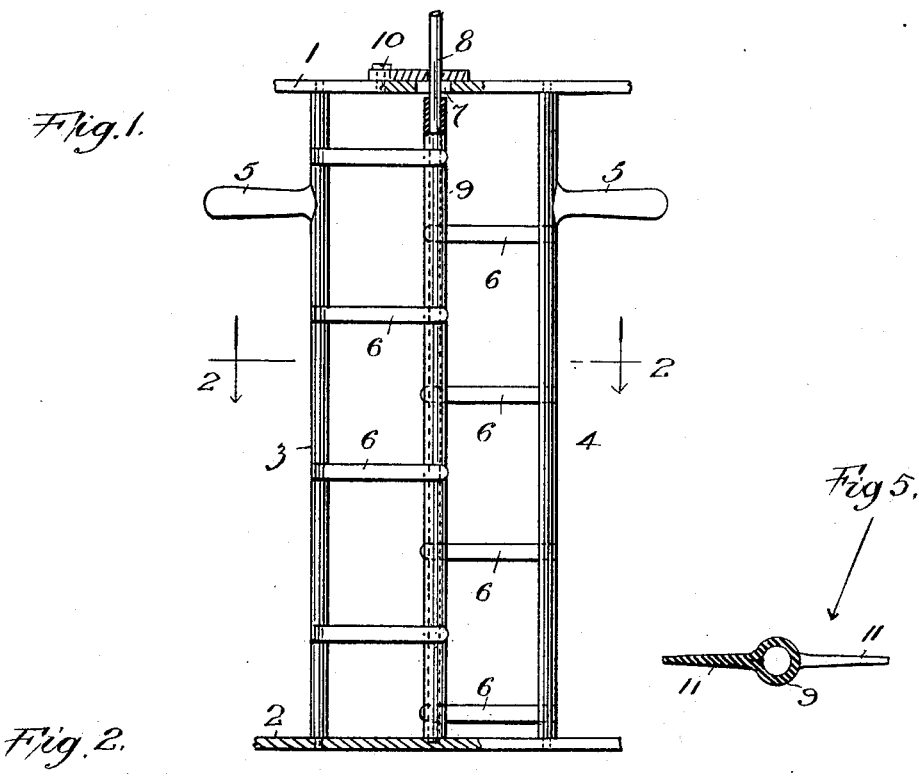
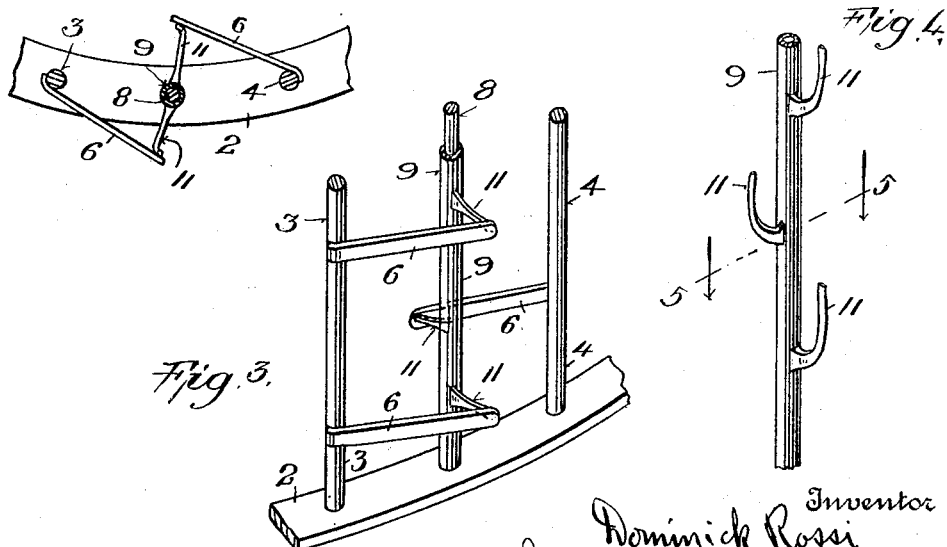
Inventor
Dominick Rossi
By his Attorney
Samuel E. Darby

UNITED STATES PATENT OFFICE.

DOMINICK ROSSI, OF NEW YORK, N. Y.

ARTIFICIAL FLOWER-STEM.

1,204,905.　　　　　Specification of Letters Patent.　　Patented Nov. 14, 1916.

Application filed August 26, 1916.　Serial No. 116,999.

*To all whom it may concern:*

Be it known that I, DOMINICK ROSSI, a citizen of the United States, residing at New York, in the county and State of New York, have made a certain new and useful Invention in Artificial Flower-Stems, of which the following is a specification.

This invention relates to the method of and means for making artificial flower stems.

The object of the invention is to provide a novel apparatus for and method of producing artificial flowers having short thorns, or projections, for example, rose stems.

A further object of the invention is to provide an artificial flower stem which is soft and pliable, extremely elastic, and which is not soluble in water or other moisture.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawing: Figure 1 is a view in elevation of an artificial stem making tool embodying my invention. Fig. 2 is a sectional view of the same taken on the line 2—2, Fig. 1 and looking in the direction of the arrows. Fig. 3 is a view in perspective of a portion of the same. Fig. 4 is a view in elevation of an artificial flower stem embodying my invention. Fig. 5 is a sectional view of the same taken on the line 5—5, Fig. 4 and looking in the direction of the arrows.

It is the purpose of my present invention to make an artificial flower stem of soft pliable elastic material, and to form thereon, thorns, or other projections, in conformance with the natural thorns or projections formed on the stem of flowers or vines, such as roses, or the like.

In carrying out my invention, I provide a solution composed of gelatin, glycerin and suitable coloring matter, and keep the solution in a plastic state by supplying a sufficient amount of heat thereto. I then coat a steel rod with the plastic solution, such as by passing the rod through the vat containing the same. The mass in its plastic condition is adhesive and adheres to the rod. I then position the rod in a suitable tool by means of which the coated rod is "tapped," that is, contact is made against the plastic coating on the rod, at any desired number or location of points and the coating on the rod adheres to the "tappers." When the "tappers" are slowly pulled away from the coated rod, thin elastic strips are stretched from the coated rod until the elastic limit is reached, and then the prongs thus formed on the tubular coat sever from the tappers. The coat on the tube is then allowed to cool, and upon cooling loses its adhesiveness, and the artificial flexible and elastic stem thus formed may be readily slipped from the rod.

In the drawings, I show the tool for making the stem wherein 1 and 2 designate the top and bottom frame in which are journaled rods 3, 4. The rods 3 and 4 are each provided with handles 5 and a plurality of prongs or "tappers" 6, preferably staggered relative to each other. The frame 1 is provided with an enlarged opening 7 at its center through which is passed the rod 8 provided with its coat 9 of the solution. The rod 8 is held in place in the frame in any suitable or desired manner, for example, by the catch 10. The handles 5 are then operated, placing the tappers 6 in contact with the coat 9 on the rod 8, and are then operated in the opposite direction, as shown best in Fig. 3, drawing out the thorn or prong portions 11 of the artificial stem. It will be understood that by varying the amount of the constituents of the solution, any desired degree of elasticity and flexibility can be secured, and by adding any suitable coloring matter, any desired color may be attained upon the product. I have found that artificial stems thus made are suitable for any purpose where artificial flowers are desired, being insoluble in water, and simple to manufacture.

Having now set forth the objects and nature of my invention, and having shown and described the method of and means for making artificial stems embodying the principles thereof, what I claim as new and useful and desire to secure by Letters Patent, is,—

1. The method of making artificial stems for flowers comprising coating a rod with a heated plastic solution containing coloring matter, tapping the same to form thorns, and finally allowing the coating to cool.

2. In a device for making artificial stems for flowers, the combination with a frame, of shafts journaled therein, said shafts provided with tappers, and means for rocking said shafts.

3. In a device for making artificial stems for flowers, the combination with a frame, of shafts journaled therein, said shafts provided with tappers, staggered relative to each other, and means for rocking said shafts.

4. In a device for making artificial stems for flowers, the combination with a frame, of shafts journaled therein, said shafts provided with tappers, means for placing a coated rod between said shafts, and means for rocking said shafts.

5. In a device for making artificial stems for flowers, the combination with a frame, of shafts journaled therein, said shafts provided with tappers, means for placing a coated rod between said shafts in said frame, and means for rocking said shafts.

In testimony whereof I have hereunto set my hand this 22nd day of August, A. D., 1916.

DOMINICK ROSSI.

Copies of this patent may be obtained for five cents each, by addressing the "Commissioner of Patents, Washington, D. C."